United States Patent Office.

FRANCIS BOWYER MILLER, OF SYDNEY, NEW SOUTH WALES.

Letters Patent No. 75,289, dated March 10, 1868.

IMPROVED PROCESS OF TREATING GOLD-BULLION TO TOUGHEN AND REFINE IT.

*The Schedule referred to in these Letters Patent and making part of the same.*

TO ALL TO WHOM IT MAY CONCERN:

Be it known that I, FRANCIS BOWYER MILLER, of the city of Sydney, in the Colony of New South Wales, assayer, a subject of the Queen of Great Britain, have invented or discovered, a new and useful "Improved Method of Toughening Brittle Gold-Bullion, of Refining Alloyed Gold, and of Separating therefrom any Silver they may Contain;" and I, the said FRANCIS BOWYER MILLER, do hereby declare the nature of the said invention, and in what manner the same is to be performed, to be particularly described and ascertained in and by the following statement thereof; that is to say—

This invention has for its object the toughening of brittle gold-bullion, and the refining of alloyed gold (whether naturally or artificially alloyed) whilst in a melted state, together with the separation therefrom of silver they may contain. This I effect by means of chlorine gas, (or hydrochloric-acid gas mixed with atmospheric air or oxygen,) brought in contact with the alloyed gold when the metal is in a molten state. In this manner the silver present, and any baser metals which render the gold brittle, are converted into chlorides, whilst the gold remains in a purified and tough condition.

Having thus stated the nature of my invention, I will proceed to describe the manner in which I prefer to operate.

I melt the gold to be operated on in a good clay crucible, (plumbago crucibles are not recommended.) The pots known as creusets de Paris, and manufactured by Payen, Rue Pierre Levée, Paris, are very suitable, and the sizes Nos. 12, 14, and 16 are most generally useful. They are suitable for refining charges of one hundred, two hundred and fifty, and five hundred ounces, respectively. I prepare the crucibles for use by dipping them into a strong and hot solution of borax, and afterwards drying them. The object of this preparation is to render them less liable to absorb the melted chloride of silver. The crucible is heated in a furnace, and the gold is melted in the usual way, with a small quantity of borax, say three-quarters per cent. The crucible has a closely-fitting cover, with a small hole bored through it; and when the metal is melted, a fire-clay tube of, say, three-sixteenths of an inch internal diameter, is inserted through this hole, so as to dip into the molten gold down to the bottom of the pot. The upper end of this tube is connected, by a vulcanized India-rubber pipe, with a glass or stone-ware vessel, in which chlorine is generated. The joints are tied round with wire, and the India-rubber is protected from the direct radiation from the fire. The chlorine-generator is fitted with a safety-tube, say six feet long, dipping, at its lower end, into the liquid in the generator, and the liquid stands in this tube to such a height as is equivalent to the pressure necessary to force the gas through the melted gold which is above the end of the fire-clay tube. The current of gas through the metal is maintained for about three hours, and the metal may advantageously be agitated, from time to time, by stopping the flow of the gas for a moment by pinching the India-rubber pipe until the pressure increases, and then allowing the accumulated gas to pass suddenly. At the end of this operation the gold will be nearly pure, and the chloride of silver formed will be floating on its surface, together with such other chlorides as may be formed, and which are not readily volatilized. The contents of the crucible may be poured out all together into moulds, so as to form ingots; and the chlorides are, in this case, detached from the surfaces of the ingots when they are cold; or, by preference, the metal is allowed to cool in the crucible until it sets, and the still liquid chlorides are then poured from its surface into a mould, so as to form a slab. The borax is, in this operation, retained in the crucible, and in this no difficulty will be found, as it is much less fluid than the chlorides. The crucible, still containing the gold, is at once replaced in the furnace until the purified gold is again melted, and it is then cast into ingots.

The crucible, if it is to be used again, should not be allowed to cool, but be replaced in the furnace as soon as the charge is poured.

The chloride of silver, and the other chlorides mixed therewith, are reduced to the metallic state by one or other of the processes commonly employed for this purpose; but, very conveniently, the slab of chlorides may be placed between two flat pieces of wrought iron, and immersed in water acidulated with sulphuric acid, and there left for a day or so, until the reduction is complete. The metal thus obtained is treated with nitric acid. The silver and other baser metals are dissolved, whilst some gold is left undissolved, and is collected and remelted with other charges, or otherwise. The silver is precipitated from the solution with common salt, as chloride of silver, by again reducing which a pure silver may be obtained.

In the process above set forth, hydrochloric-acid gas, mixed with atmospheric air or oxygen, may be passed into the molten gold in place of chlorine. The operation is in all respects similar, except that a generator of hydrochloric-acid gas is substituted for the chlorine-generator, connected, by means of a vulcanized India-rubber pipe, with a gas-holder, from which air or, preferably, oxygen can be supplied under pressure regulated by a stop-cock. A mixture of hydrochloric-acid gas with air or oxygen is thus obtained, which is passed through the molten gold in the manner above described, for the similar operation with chlorine. This mixture of hydrochloric-acid gas with air or oxygen is, however, less efficient and convenient than chlorine, more especially when the object is the separation of the silver rather than the toughening of the gold by the removal of the baser metals. A very small quantity of the silver contained in the alloyed gold will be volatiliz'd during the process. It may be recovered from time to time by treating the sweepings from the flues. A larger, but still a small quantity of the chloride of silver, is taken up by the borax, or is absorbed in the substance of the crucible. This I recover by crushing the flux, and the crucible, when it is past further use, and treating them with weak ammonia, which dissolves out the cholride of silver; and this is afterwards precipitated by the addition of an acid, and the silver is reduced from it. Or I place the powdered flux and crucible in a revolving barrel with wrought scrap-iron and mercury, together with sufficient water to form a thin paste. By this means the silver is recovered as an amalgam, together with a little gold.

I would remark that the details of the operation may be considerably varied without departing from the invention, which consists in bringing the alloyed gold, when in a molten state, into contact with chlorine or hydrochloric-acid gas, (the latter mixed with or in the presence of atmospheric air or oxygen,) in such manner that the silver, or the baser metals it may contain, may be separated from it as chlorides, as herein explained.

Having thus described the several methods in which I have contemplated the application of the principl or character of my invention, what I claim as my invention, and desire to secure by Letters Patent, is—

The process of refining gold by applying chlorine to it while in a molten state, substantially as hereinbefore set forth.

FRS. BOWYER MILLER.

Witnesses:
W. BRICKETT, *Solicitor, Sydney, New South Wales.*
JNO. ROBERTSON, *of the same Place, Gentleman.*